(12) United States Patent
Kim

(10) Patent No.: US 10,343,064 B2
(45) Date of Patent: Jul. 9, 2019

(54) GAME SERVICE PROVISION APPARATUS AND METHOD OF CONTROLLING THE SAME

(71) Applicant: NEXON RED CORP., Seongnam-si (KR)

(72) Inventor: Sung Woong Kim, Seoul (KR)

(73) Assignee: NEXON RED CORP., Seongnam-si (KR)

( * ) Notice: Subject to any disclaimer, the term of this patent is extended or adjusted under 35 U.S.C. 154(b) by 525 days.

(21) Appl. No.: 14/884,444

(22) Filed: Oct. 15, 2015

(65) Prior Publication Data

US 2016/0361648 A1 Dec. 15, 2016

(30) Foreign Application Priority Data

Jun. 10, 2015 (KR) ........................ 10-2015-0081853

(51) Int. Cl.
*A63F 13/53* (2014.01)
*A63F 13/426* (2014.01)
*A63F 13/2145* (2014.01)

(52) U.S. Cl.
CPC ........ *A63F 13/426* (2014.09); *A63F 13/2145* (2014.09); *A63F 13/53* (2014.09)

(58) Field of Classification Search
CPC ..... A63F 13/426; A63F 13/2145; A63F 13/53
See application file for complete search history.

(56) References Cited

U.S. PATENT DOCUMENTS

| 6,729,954 B2 * | 5/2004 | Atsumi | A63F 13/10 434/11 |
| 9,864,933 B1 * | 1/2018 | Cosic | G06K 9/66 |
| 2004/0157662 A1 * | 8/2004 | Tsuchiya | A63F 13/10 463/32 |

(Continued)

FOREIGN PATENT DOCUMENTS

| KR | 10-2010-0068335 A | 6/2010 |
| KR | 10-2014-0062747 A | 5/2014 |

OTHER PUBLICATIONS

"Clash of Clans Gameplay" published by user Dreadtle on Jun. 9, 2013 on YouTube.com, retrieved from <<url:https://www.youtube.com/watch?v=F_cr9hLThTg>>.*

(Continued)

*Primary Examiner* — Kang Hu
*Assistant Examiner* — Malina D Blaise
(74) *Attorney, Agent, or Firm* — KORUS Patent, LLC; Seong Il Jeong

(57) ABSTRACT

A service provision apparatus and a method of controlling a service provision apparatus for providing game service are disclosed herein. The service provision apparatus for providing game service includes an input acquisition unit, a character placement unit, and a character movement unit. The input acquisition unit acquires a first user input and a second user input based on input events. The character placement unit places a character based on information about a location within a game space included in the first user input. The character movement unit controls the movement of a character, selected based on control region information included in the second user input, based on information about a location within the game space, i.e., a destination, included in the second user input.

9 Claims, 8 Drawing Sheets

(56) References Cited

U.S. PATENT DOCUMENTS

| | | | | |
|---|---|---|---|---|
| 2004/0224739 A1* | 11/2004 | Yamada | A63F 13/10 | 463/1 |
| 2005/0221880 A1* | 10/2005 | Kando | A63F 13/10 | 463/9 |
| 2006/0258453 A1* | 11/2006 | Kando | A63F 13/10 | 463/36 |
| 2006/0281546 A1* | 12/2006 | Iwamoto | A63F 13/2145 | 463/32 |
| 2007/0155455 A1* | 7/2007 | Fujioka | A63F 13/10 | 463/3 |
| 2007/0218992 A1* | 9/2007 | Maehiro | A63F 13/00 | 463/31 |
| 2008/0146328 A1* | 6/2008 | Ishii | A63F 13/10 | 463/31 |
| 2008/0291173 A1* | 11/2008 | Suzuki | A63F 13/10 | 345/173 |
| 2009/0241038 A1* | 9/2009 | Izuno | A63F 13/426 | 715/757 |
| 2009/0253505 A1* | 10/2009 | Ogawa | A63F 13/10 | 463/31 |
| 2012/0142429 A1* | 6/2012 | Muller | A63F 13/35 | 463/42 |
| 2012/0184368 A1* | 7/2012 | Yamaoka | A63F 13/2145 | 463/31 |
| 2014/0135119 A1* | 5/2014 | Yamada | A63F 13/10 | 463/31 |
| 2014/0335951 A1* | 11/2014 | Matsunaga | A63F 13/2145 | 463/31 |
| 2014/0357356 A1* | 12/2014 | Horie | A63F 13/00 | 463/31 |
| 2014/0357359 A1* | 12/2014 | Kando | A63F 13/00 | 463/31 |
| 2015/0111628 A1* | 4/2015 | Yasue | A63F 13/12 | 463/9 |
| 2015/0157932 A1* | 6/2015 | Kwon | G06Q 50/00 | 463/31 |
| 2015/0224403 A1* | 8/2015 | Hisaoka | A63F 13/537 | 463/29 |
| 2015/0268807 A1* | 9/2015 | Truong | G06F 3/0484 | 715/800 |
| 2016/0271491 A1* | 9/2016 | Yamaguchi | A63F 13/42 | |

OTHER PUBLICATIONS

"Rise of Nations Attack and Victory" published by user SuperRt47 on Jun. 22, 2012 on YouTube.com, retrieved from <<url:https://www.youtube.com/watch?v=b-HkB6MBURI>>.*

"Autumn Dynasty Multiplayer Tactics HD" published by user fernfreak on Dec. 28, 2011 on YouTube.com, retrieved from <<url:https://www.youtube.com/watch?v=yFzRfISOi_s>>.*

YouTube, "DomiNations: Conquer Nations Like a Pro," https://www.youtube.com/watch?v=nisGgCgS7NQ, Published on Feb. 13, 2015.

YouTube, "Starcraft on Android," https://www.youtube.com/watch?v=WVYEZyP-UGQ&list=PLbQnPW3gKe_SdhimjH6L5qAZz7d7OUEds, Published on Jul. 6, 2013.

* cited by examiner

GAME SERVICE PROVISION APPARATUS AND METHOD OF CONTROLLING THE SAME

CROSS-REFERENCE TO RELATED APPLICATION

This application claims priority of Korean Patent Application No. 10-2015-0081853 filed on Jun. 10, 2015, the entire contents of which are incorporated herein by reference.

BACKGROUND

Technical Field

The present invention relates generally to a service provision apparatus for providing game service and, more particularly, to a game service provision apparatus and a method of controlling the same that are capable of easily controlling characters within a game space.

Description of the Related Art

Recently, games that can be played using electronic terminals have been widely popularized. By way of example, wireless mobile games that are provided via simple portable terminals that can be easily carried and manipulated have been widely popularized.

In many types of games now in service, characters are provided within a game space, and a user can enjoy a game while selecting and controlling the characters provided within the game space.

That is, since the effective control of characters within a game space has become a factor that determines interest in the playing of a game, a method of conveniently controlling characters within a game space is being pursued.

Korean Patent Application Publication No. 10-2010-0068335, which is a related conventional art, suggests an input device, a control device, a control system and a control method that are capable of correcting a corresponding output signal when a hand shaking input to the input device is present and preventing a user from sensing a phase delay. However, the conventional art merely increases the accuracy of input, but cannot provide any convenience regarding the control of characters within a game space. Accordingly, there is a need for a technology that is capable of simply controlling characters within a game space.

Meanwhile, the above-described background technology corresponds to technical information that the present inventor has possessed in order to devise the present invention or that has been acquired in the process of devising the present invention, and cannot be necessarily viewed as a well-known technology that had been known to the public before the application of the present invention.

SUMMARY

At least one embodiment of the present invention is directed to the provision of a game service provision apparatus and a method of controlling the same.

According to an aspect of the present invention, there is provided a service provision apparatus for providing game service, the service provision apparatus including: an input acquisition unit configured to acquire a first user input and a second user input based on input events; a character placement unit configured to place a character based on information about a location within a game space included in the first user input; and a character movement unit configured to control the movement of a character, selected based on control region information included in the second user input, based on information about a destination location within the game space included in the second user input.

According to another aspect of the present invention, there is provided a method of controlling a service provision apparatus for providing game service, the method including: acquiring a first user input including information about a location within a game space; placing a character based on the information about the location included in the first user input; acquiring a second user input including information about a destination location of a character within the game space, and control region information; and controlling the movement of the character, selected based on the control region information, to the destination location based on the second user input.

According to still another aspect of the present invention, there is provided a computer-readable storage medium having stored thereon a computer program that, when executed by a processor, causes the processor to execute a method of controlling a service provision apparatus for providing game service, the method including: acquiring a first user input including information about a location within a game space; placing a character based on the information about the location included in the first user input; acquiring a second user input including information about a destination location of a character within the game space, and control region information; and controlling the movement of the character, selected based on the control region information, to the destination location based on the second user input.

According to yet another aspect of the present invention, there is provided a computer program that is executed by a service provision apparatus and is stored in a storage medium to perform a method of controlling a service provision apparatus for providing game service, the method including: acquiring a first user input including information about a location within a game space; placing a character based on the information about the location included in the first user input; acquiring a second user input including information about a destination location of a character within the game space, and control region information; and controlling the movement of the character, selected based on the control region information, to the destination location based on the second user input.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

Figure 1:
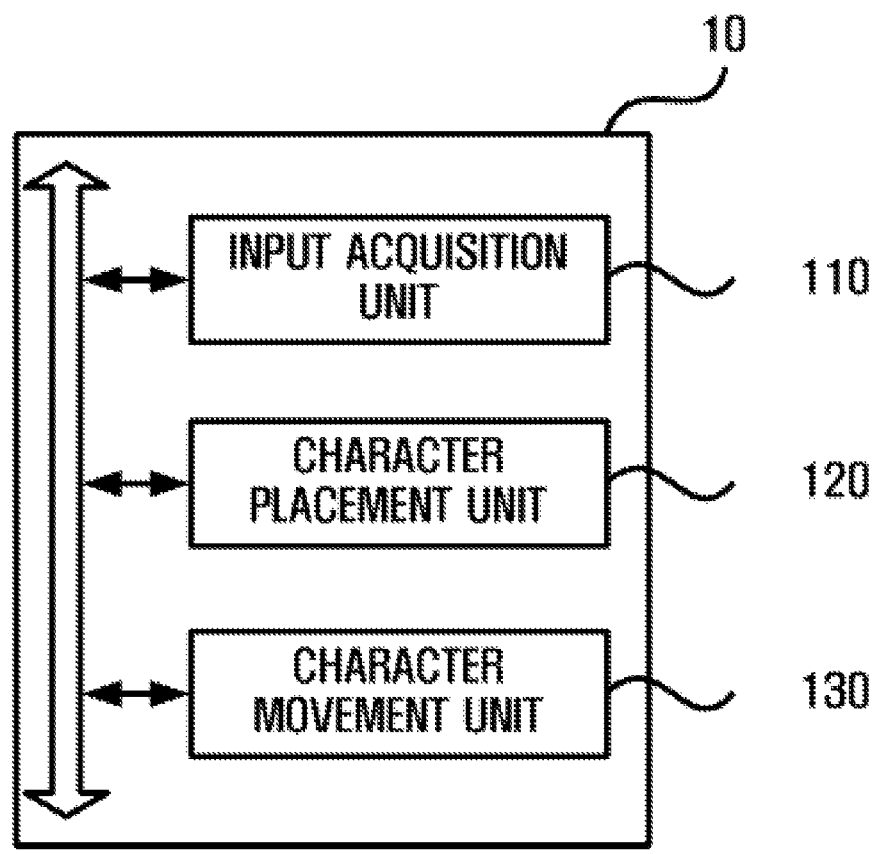
FIG. 1 is a block diagram showing a service provision apparatus for providing game service according to an embodiment of the present invention.

Embodiments of the present invention will be described in detail below with reference to the accompanying drawings so that those having ordinary knowledge in the art to which the present invention pertains can easily practice the present invention. However, the present invention may be implemented in various different forms, and are not limited to the embodiments described herein. Furthermore, in the drawings, portions unrelated to descriptions are omitted in the drawings in order to clearly describe the present invention, and the same or similar reference symbols are assigned to the same or similar components throughout the specification.

Throughout the specification and the claims, when a portion or component is described as being connected to another portion or component, this includes not only a case where they are directly connected to each other but also a case where they are electrically connected to each other with a third portion or component interposed therebetween. Furthermore, when a portion or component is described as including another portion or component, this means that a third portion or component is not be excluded from the first portion or component but may be included in the first portion or component, unless particularly described to the contrary.

Embodiments of the present invention are described in detail below with reference to the accompanying drawings.

Prior to the following description, the meanings of terms used herein are defined first.

The term "game space" used herein is a virtual space in which a game is played, and includes a region within a specific range which is represented in the form of two-dimensional or three-dimensional graphics and within which game objects can be moved. In a single game, a plurality of differently designed game spaces may be selectively provided, and each player may be allowed to select one of the plurality of game spaces or to access only some of the game spaces depending on the game level of the player.

The term "character" used herein is a fictitious character appearing in a "game space," and is an object that is controlled by each player (i.e., a user) and an agent that performs actions to play a game. Each character may be visualized in the form of a two-dimensional or three-dimensional graphic image.

The term "action" (of a character) used herein is a motion performed by the character within a game space in order to play a game. For example, the action may include a manual action in which a character disposed within a game space moves within the game space or interacts with the object within the game space under the control of a user. Furthermore, for example, the action may include an automatic action in which when a character is disposed within a game space, the character moves within the game space or interacts with an object within the game space in accordance with a predetermined game scenario without the control of a user after a certain command is input by the user.

Other terms that need to be described will be separately described below.

FIG. 1 is a block diagram showing a service provision apparatus 10 for providing game service according to an embodiment of the present invention.

The service provision apparatus 10 stores various types of information related to the execution of a game, such as game space information, game scenario information and game quest information, and detects and records various events generated within the game, thereby enabling the time series execution of the game.

The service provision apparatus 10 may be implemented as an electronic terminal in which a game application has been installed. Furthermore, the service provision apparatus 10 may be implemented as a server-client system. The server-client system may include an electronic terminal in which a client configured to interact with a user has been installed.

The electronic terminal may be implemented as a computer, a portable terminal, a television, or a wearable device including an interface that is capable of interacting with a user. In this case, the computer may include, for example, a notebook computer, a desktop computer, and a laptop computer in which a web browser has been installed. The portable terminal is, for example, a wireless communication device that guarantees portability and mobility, and may include all types of handheld-based wireless communication devices, such as a Personal Communication System (PCS) device, a Personal Digital Cellular (PCD) device, a Personal Handyphone System (PHS) device, a Personal Digital Assistant (PDA), a device for the Global System for Mobile Communications (GSM), an International Mobile Telecommunication (IMT)-2000 device, a Code Division Multiple Access (CDMA)-2000 device, a W-Code Division Multiple Access (W-CDMA) device, a Wireless Broadband Internet (Wibro) device, a smart phone, and a device for the Mobile Worldwide Interoperability for Microwave Access (Mobile WiMAX). Furthermore, the television may include an Internet Protocol television (IPTV), an Internet television, a terrestrial TV, and a cable TV. Moreover, the wearable device is an information processing device that can be directly worn on the human body, such as a watch, glasses, an accessory, clothing, and shoes, and may be connected to a server at a remote location or another terminal over a network directly or by way of another information processing device.

Furthermore, the electronic terminal may detect the generation of an input event when it detects the click, touch, or tap of a user via an interface. The input event may include information about the input point of a user.

For example, the electronic terminal may include a touch panel display, configured to perform interaction with a user by detecting the touch of the user, as an interface. The electronic terminal may acquire a generated input event by detecting the touch of the user on the touch panel display. That is, the electronic terminal may more elaborately acquire an input event via touch input that is simple and has less erroneous operation.

The service provision apparatus 10 implemented as the above-described electronic terminal may include an input acquisition unit 110, a character placement unit 120, and a character movement unit 130.

Furthermore, the service provision apparatus 10 may further include a communication unit (not shown) configured to enable communication between internal components, i.e., the input acquisition unit 110, the character placement unit 120, and the character movement unit 130, and may also enable communication with external components.

The service provision apparatus 10 may further include a storage unit (not shown) configured to store data adapted to perform a method of controlling a service provision apparatus according to an embodiment of the present invention, or may communicate with a storage device (not shown) present at an external location, for example, a database.

The input acquisition unit 110 according to an embodiment of the present invention acquires a first user input and a second user input based on input events.

The "first user input" is an input adapted to determine a location to which a character not present in a game space will be placed, and may include information about the location within the game space. Furthermore, the "second user input" is an input adapted to select a character that belongs to characters present in a game space and that is to be moved to a destination and then move the selected character. The second user input may include information about a control region in which the character to be moved will be selected and information about the location within the game space, i.e., the destination.

That is, the input acquisition unit 110 may detect an input event for a game space, and may acquire a first user input, including an input point, included in the input event (i.e., a location at which the input event occurs), as information about a location within the game space. In this case, the game space may be divided into a placement region to which a character can be placed and a non-placement region to which a character cannot be placed. The term "place (or placement)" means that a character not present in the game space appears within the game space. Accordingly, if a location at which an input event occurs is included in the placement region of the game space, the input acquisition unit 110 may acquire a first user input, including the location at which the input event occurs as information about a location within the game space.

Furthermore, the input acquisition unit 110 may detect an input event for the game space, and may acquire a second user input, including an input point, included in the input event, as information about a location within the game space. That is, if a location at which an input event occurs is included in a region other than the placement region of a game space, the input acquisition unit 110 may acquire a second user input, including the location at which the input event occurs as information about a location within the game space.

In addition, when an input event for the game space is detected, the input acquisition unit 110 may provide a control region icon based on a location at which the input event occurs, may acquire information about a control region via the control region icon, and may acquire a second user input including the information about the control region.

That is, the input acquisition unit 110 may determine an overlapping region between a region within the game space and the control region icon, and may acquire a second user input, including the determined region as the information about the control region.

The control region icon is implemented in the form of a shape or the like so that a range, in which characters that are present in the game space and that are to be moved to a destination are located, can be intuitively displayed to a user. For example, the control region icon may be implemented in a circular shape. In the following, the control region icon is assumed to have a circular shape for convenience of description, but the shape of the control region icon is not limited to a circle.

Furthermore, although the control region icon may have a fixed shape, the shape of the control region icon may be deformed over time or when an input event occurs. Accordingly, the input acquisition unit 110 may provide the control region icon in the form of a dynamically deformable animation.

That is, a change in the size of the control region icon may be displayed in the form of a deformable animation in such a way that the size is increased or decreased based on the central point of the control region icon (e.g., a location at which an input event occurs). For example, the size of the control region icon may continue to increase when an input event continues to occur within a specific radius around a location in the non-placement region.

Furthermore, the input acquisition unit 110 may determine the size of a control region icon when a specific number of input events occur after the control region icon has been provided or when a subsequent input event does not occur until a specific time elapses, as a final size, may determine information about a control region based on a control region icon having the final size, and may acquire a second user input including the control region information.

The character placement unit 120 places a character to the game space.

In particular, the character placement unit 120 may place a character based on the information about the location within the game space that is included in the first user input.

For example, the character placement unit 120 may place one or more characters in a region within a specific radius around the location of the game space corresponding to the first user input.

The character movement unit 130 moves a character located within the game space.

In particular, the character movement unit 130 may control the movement of a character, selected based on the information about the control region included in the second user input, based on the information about the location within the game space, i.e., the destination location included in the second user input. Accordingly, the character movement unit 130 may move the character, selected based on the information about the control region included in the second user input, to, for example, a region within a specific radius around the destination included in the second user input.

Furthermore, when the selected character is performing an action before the second user input is acquired, the character movement unit 130 may perform control to terminate the action and move the selected character to the destination.

Furthermore, when the selected character is performing an action before the second user input is acquired, the character movement unit 130 may wait until the selected character completes the action and control the selected character to move to the destination.

Since the service provision apparatus 10 includes the above-described components, it may simultaneously perform the selection of a character to be moved and the setting of the destination of the selected character via only simple input.

Figure 2:
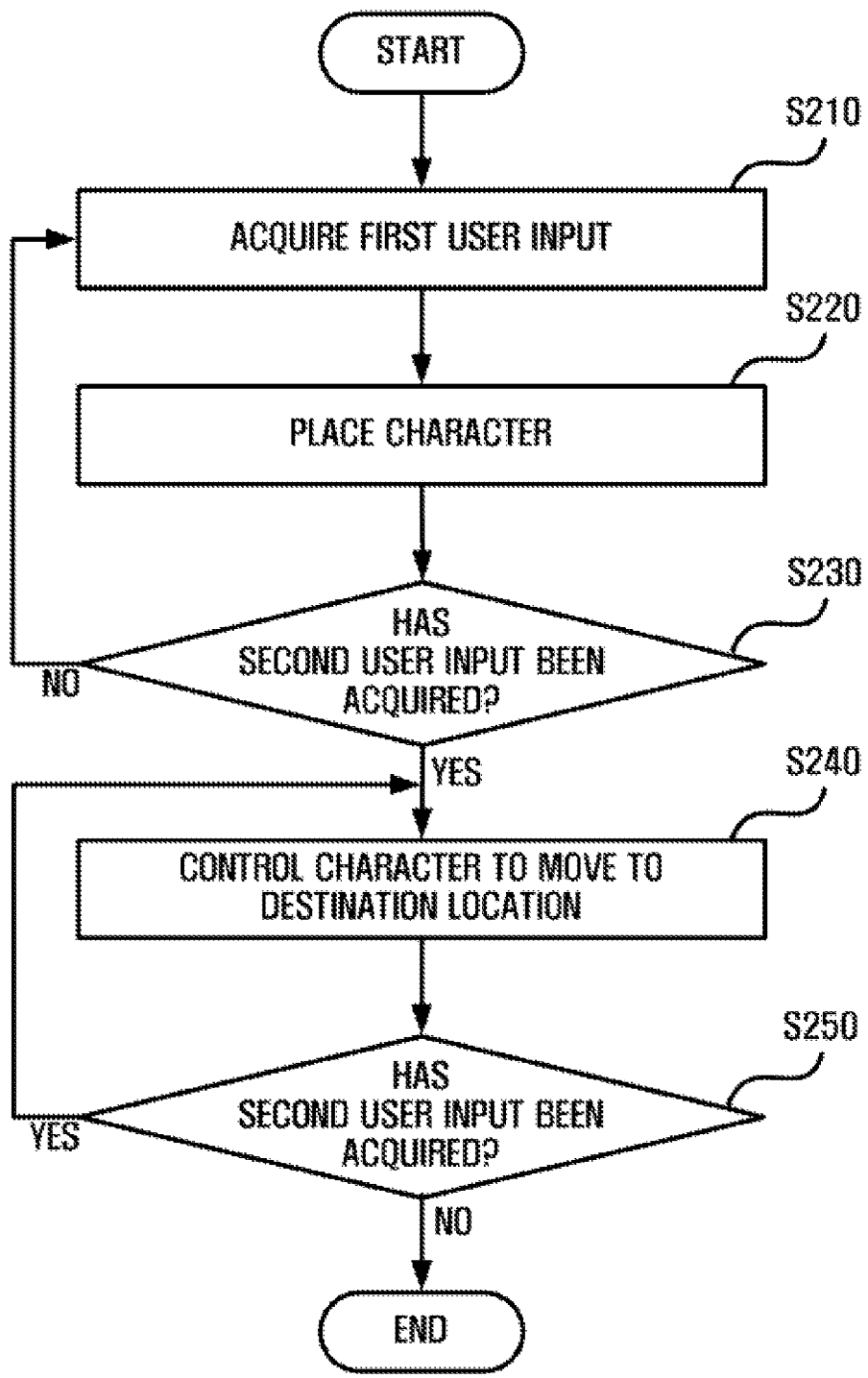
FIG. 2 is a flowchart showing a method of controlling a service provision apparatus according to an embodiment of the present invention.

A method of controlling the service provision apparatus illustrated in FIG. 2 according to the embodiment of the present invention includes steps that are processed in times series by the service provision apparatus 10 of FIG. 1. Accordingly, although descriptions of some items are omitted in the present embodiment, the items described in connection with the service provision apparatus 10 illustrated in FIG. 1 may also be applied to the method of controlling the service provision apparatus illustrated in FIG. 2 according to the embodiment of the present invention.

The method of FIG. 2 is described with reference to FIGS. 3 to 8 in detail below. FIGS. 3 to 8 are exemplary diagrams showing a method of controlling a service provision apparatus according to an embodiment of the present invention. FIGS. 3 to 8 illustrate an example of a game screen displayed via the screen D of an electronic terminal in which the service provision apparatus 10 is implemented.

As shown in FIG. 2, the service provision apparatus 10 may acquire a first user input including information about a location within a game space at step S210.

That is, the service provision apparatus 10 may acquire an input event occurring in response to, for example, the touch of a user on a touch panel display, and may acquire the first user input based on the input event.

Furthermore, the service provision apparatus 10 may place a character based on the information about the location included in the first user input at step S220.

Figure 3:
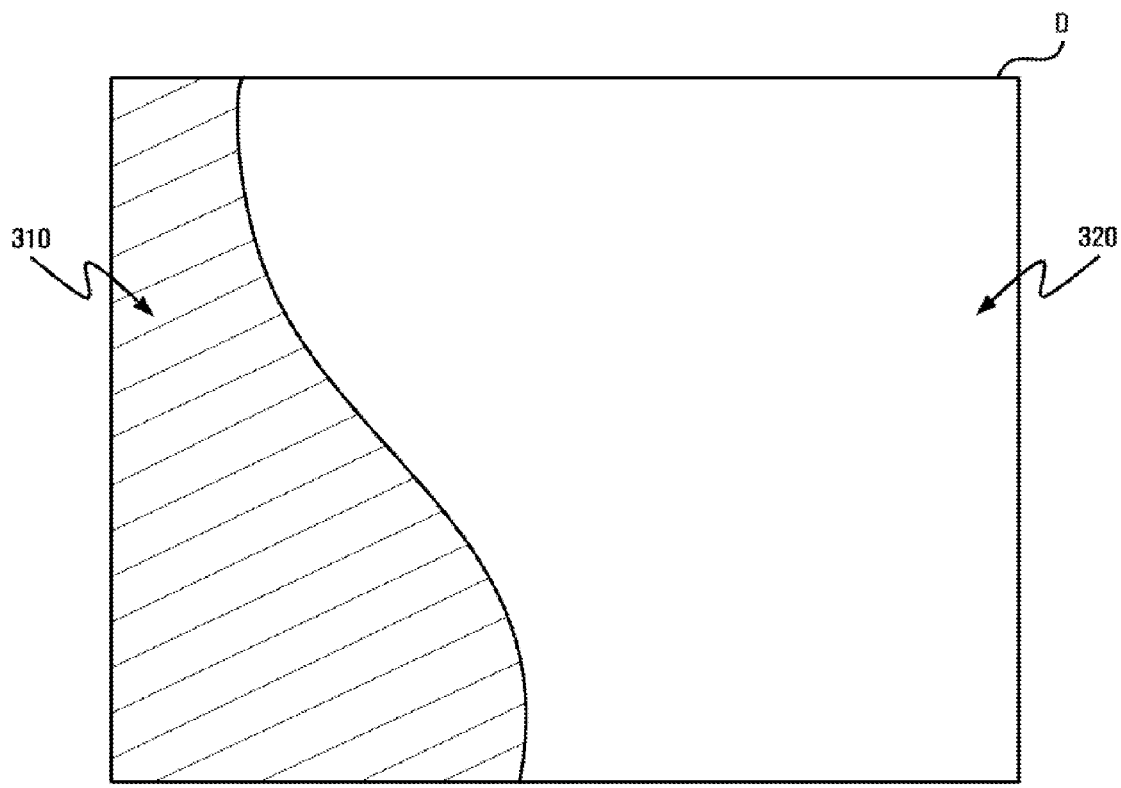
FIGS. 3 to 8 are exemplary diagrams showing a method of controlling a service provision apparatus according to an embodiment of the present invention.

In connection with this, as shown in FIG. 3, the service provision apparatus 10 may provide the game space. In this case, the game space may include a placement region 310 to which a character can be placed and a non-placement region 320 to which a character cannot be placed. Accordingly, if a location at which an input event occurs is included in the placement region of the game space, the service provision apparatus 10 may acquire a first user input including the location at which the input event occurs.

Figure 4:
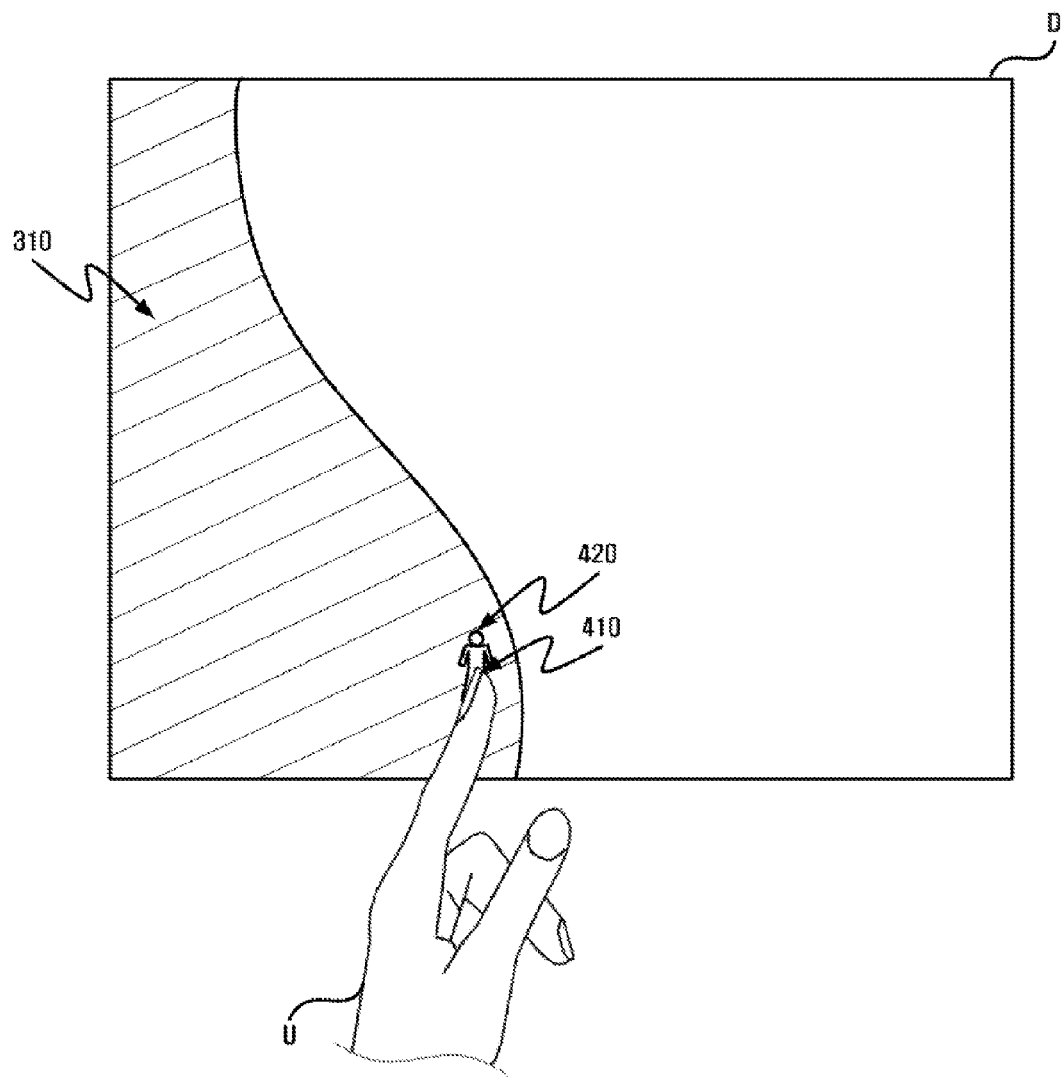

That is, the service provision apparatus 10 includes a touch panel display. As shown in FIG. 4, when a user U makes a touch input to a point 410 within the placement region 310 via the touch panel display, the service provision apparatus 10 may detect the occurrence of an input event within the placement region 310. Furthermore, the service provision apparatus 10 may acquire a first user input including the location 410 as location information, and may place a character 420 on the location 410 included in the first user input.

The service provision apparatus 10 may place a character on a location within the game space included in the first user input until it detects a new input event, and may acquire a second user input based on the new input event (i.e., while the service provision apparatus is acquiring the first user input based on the new input event).

Figure 5:
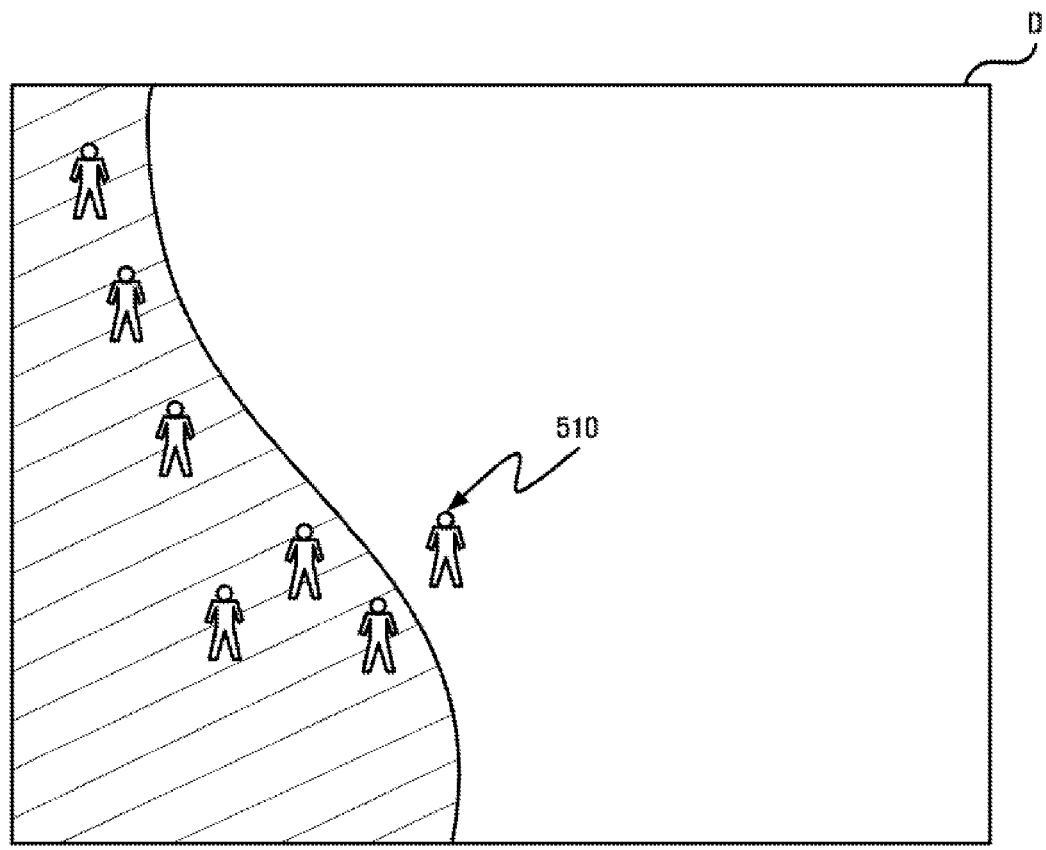

Furthermore, the character placed in the game space may perform an action in accordance with a game scenario. In this case, for example, if the action of the character is the automatic action of moving to a specific location, the placed character 510 may move within the game space, as shown in FIG. 5.

The service provision apparatus 10 may acquire a second user input based on the input event at step S230.

The service provision apparatus 10 may acquire an input event in response to, for example, the touch of the user on a touch panel display, and may acquire a second user input based on the input event.

In this case, if a location at which the input event occurs is included in the non-placement region of the game space, the service provision apparatus 10 may acquire the second user input including information about the location at which the input event occurs and a control region.

The service provision apparatus 10 may provide a control region icon so that the information about the control region may be intuitively set, and may display the control region icon in the form of deformable animation that dynamically deforms the control region icon. In this case, the deformable animation may be an animation adapted to dynamically deform the size of the control region icon, and may be an animation adapted to dynamically deform the size of the control region icon based on, for example, the number of occurring input events.

Figure 6:
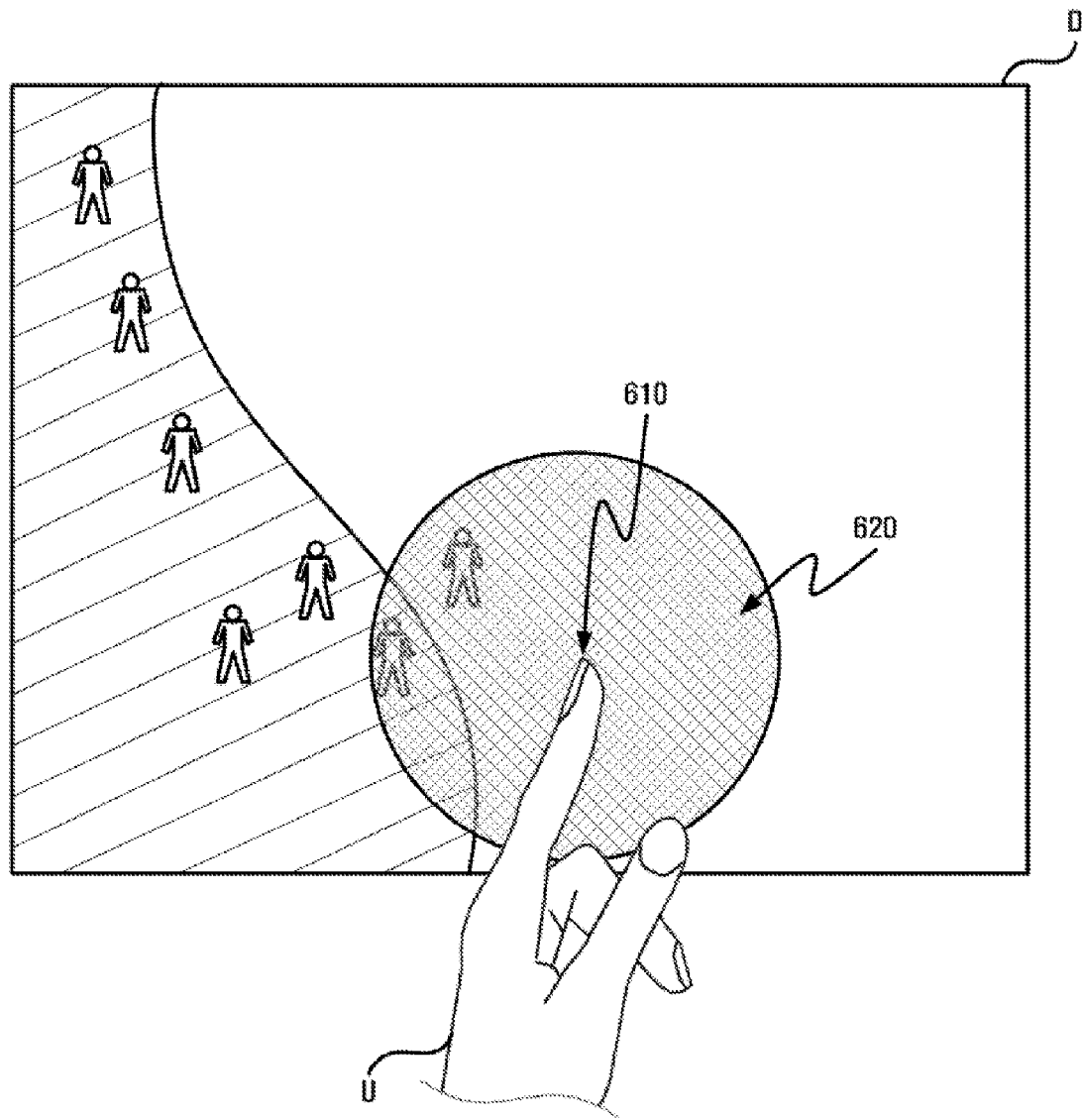

As shown in FIG. 6, when the user U makes a touch input to a point 610 via the touch panel display and thus an input event occurs, the service provision apparatus 10 may determine a location at which the input event occurs as a destination location 610, and may provide a control region icon 620 based on the destination location 610. In this case, the size of the control region icon 620 may be dynamically varied. For example, when a touch input is repeated a specific number of times at locations within a specific range within a specific period, the size of a control region icon 720 may be increased compared to the size of the control region icon 620, as shown in FIG. 7.

If the control region icon is finally determined as described above, the service provision apparatus 10 may determine an overlapping region between the control region icon and the game space, and may include the determined region in the second user input as information about the control region.

Furthermore, after the second user input has been acquired as described above, the service provision apparatus 10 may control a character based on the information about the control region and the information about the destination location included in the second user input. That is, the service provision apparatus 10 may control the movement of a character, selected based on the information about the control region, to the destination location at step S240.

Figure 7:
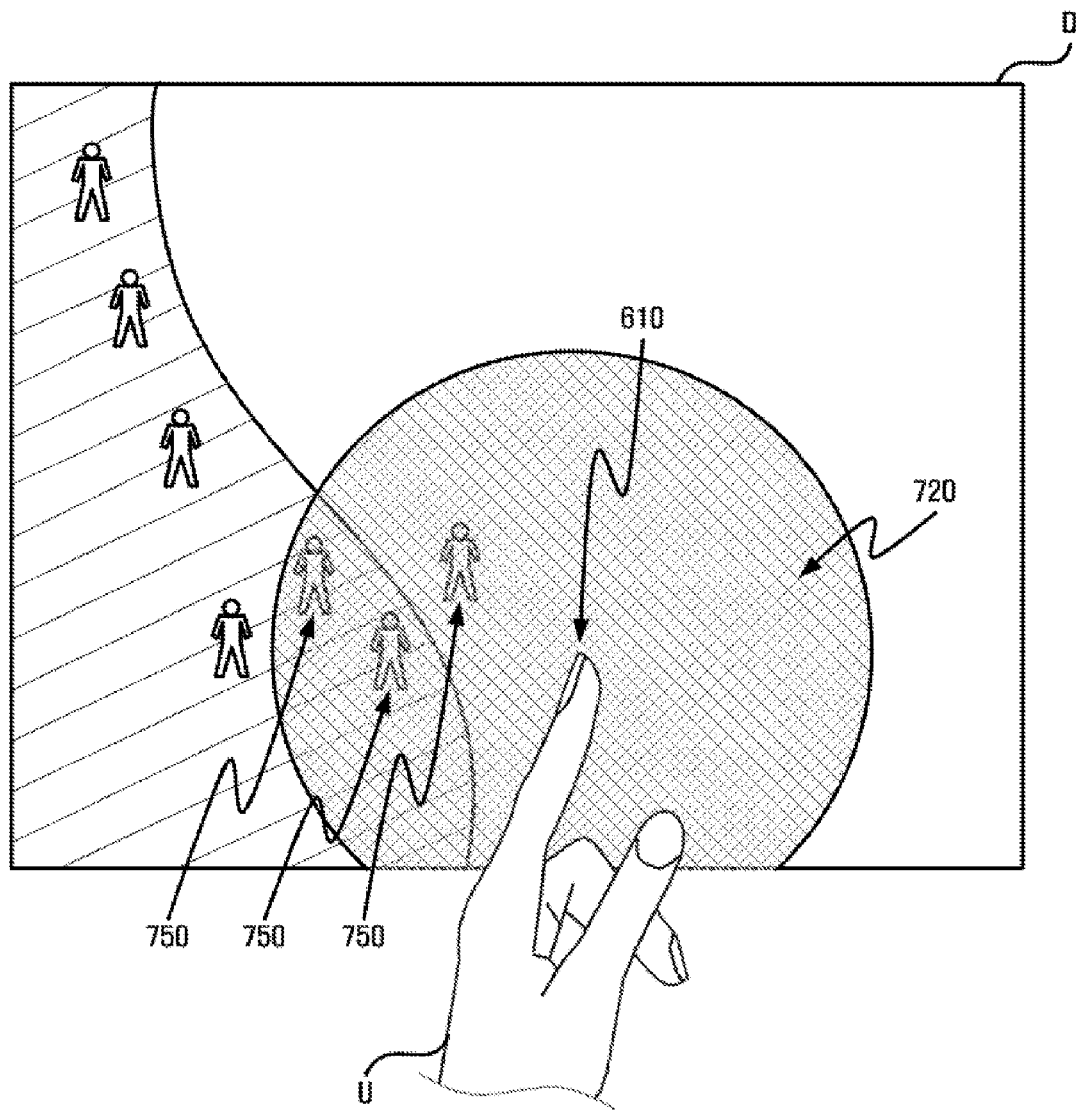
Figure 8:
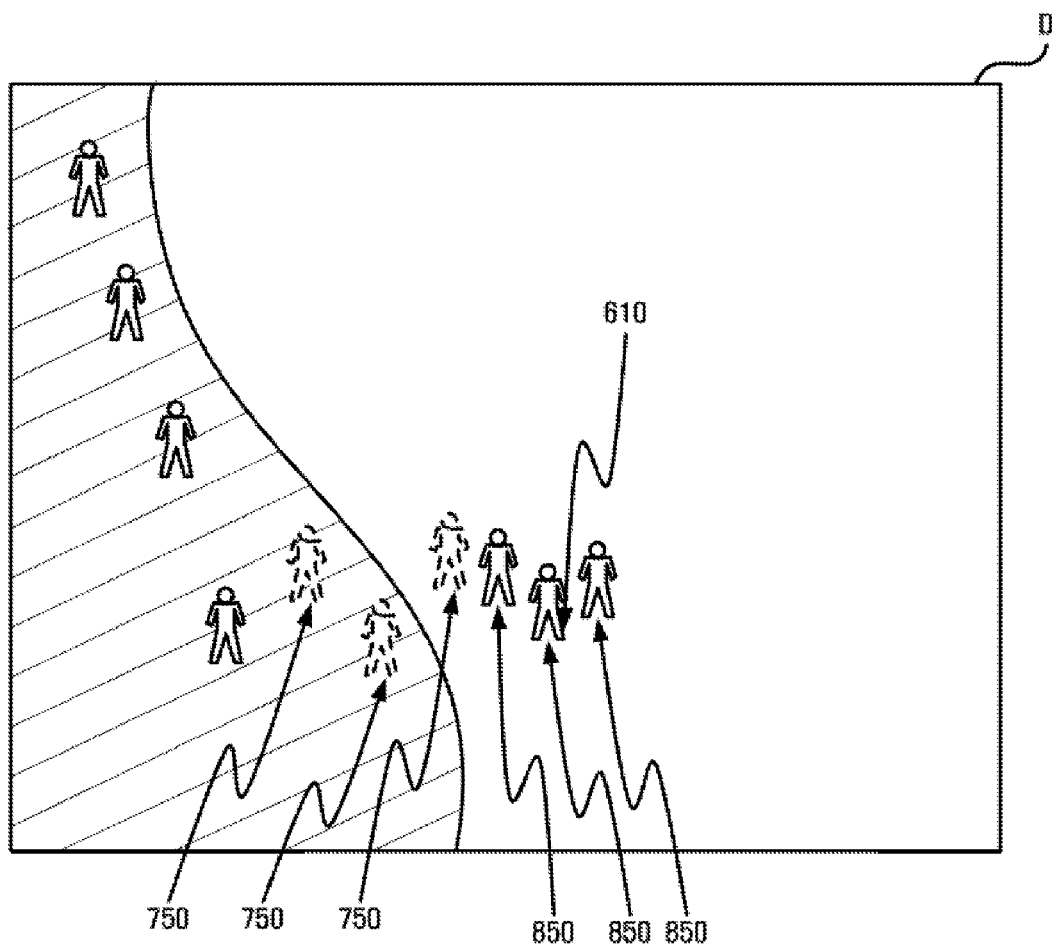

Accordingly, as shown in FIG. 7, the service provision apparatus 10 may select a character 750 based on the control region icon 720 and the information about the control region, i.e., the overlapped region within the game space, and may control the movement of the selected character to the destination location 610. As a result, the character 750 located within the region of the control region icon 720 is selected. As shown in FIG. 8, the service provision apparatus 10 may perform control so that the selected character 750 moves to the destination location 610 (or within a specific range of the destination location) and thus the character 850 is located at the destination.

In this case, if the selected character is performing an action, the service provision apparatus 10 may perform control to terminate the action and move the selected character to the destination. Furthermore, if the selected character is performing an action, the service provision apparatus 10 may control the movement of the selected character to the destination after the action has been completed.

The service provision apparatus 10 may detect a new input event and repeat step S240, at step S250, while acquiring a second user input based on the input event.

A user who plays a game provided by the service provision apparatus 10 may select a character via a simple input (e.g., a touch input), and may easily move the selected character. In particular, if a character input via the first user input performs an automatic action, a user may play the game in accordance with various strategies while controlling the character via a second user input.

In accordance with at least some embodiments of the present invention, there can be proposed the game service provision apparatus and the method of controlling the same.

In accordance with at least some embodiments of the present invention, there can be proposed the game service provision apparatus and the method of controlling the same, which enable a user to easily select a character, to be moved, from characters within a game space.

According to at least some embodiments of the present invention, there can be proposed the game service provision apparatus and the method of controlling the same, which enable a user to easily set the destination of a character to be moved within a game space.

According to at least some embodiments of the present invention, there can be proposed the game service provision apparatus and the method of controlling the same, which enable a user to select a character to be moved within a game space and set the destination of the character to be moved at the same time.

According to at least some embodiments of the present invention, there can be proposed the game service provision apparatus and the method of controlling the same, which enable a user to select a character to be moved and set the destination of the character to be moved by only simple touch input and which can simultaneously process the selection of a character and the setting of a destination via only simple touch input.

According to at least some embodiments of the present invention, there can be proposed the game service provision apparatus and the method of controlling the same, which enable a user to select and control a character by simple input. Using this, a user can easily select a character, can directly select an attack target of the selected character, and can play a game while freely using various strategies.

The advantages that can be achieved by the present invention are not limited to the above-described advantages, and other advantages that have not been described can be clearly understood by those skilled in the art from the above description.

The term "~unit" used herein means, but is not limited to, a software or hardware component, such as a field programmable gate array (FPGA) or an application-specific integrated circuit (ASIC), and performs a specific task. However, the "~unit" is not limited to software or hardware. The "~unit" may be configured to reside on an addressable storage medium, and may be configured to operate on one or more processors. Accordingly, the "~unit" may include, for example, components, such as software components, object-oriented software components, class components and task components, processes, functions, attributes, procedures, sub-routines, segments of program code, drivers, firmware, microcode, circuitry, data, databases, data structures, tables, arrays, and variables. Functions provided in components and "~units" may be combined into a smaller number of components and "~units," or may be further divided into additional components and "~units."

Furthermore, the components and "~units" may be implemented to operate one or more CPUs within a device or a security multimedia card.

The method of controlling a service provision apparatus according to an embodiment of the present invention, described with reference to FIG. 2, may also be implemented in the form of a storage medium including computer-executable instructions, such as a program module executed by a computer. A computer-readable medium may be a specific available medium accessible to a computer, and includes both volatile and non-volatile media and separable and non-separable type media. Furthermore, the computer-readable medium may include both a computer storage medium and a communication medium. The computer storage medium includes all of volatile and non-volatile media and separable and non-separable type media implemented using a specific method or technique for storing information, such as computer-readable instructions, data structures, program modules, and other data. The communication medium typically includes computer-readable instructions, data structures, program modules, other data of a modulated data signal, such as carriers, or other transmission mechanisms, and also includes specific information transfer media.

Furthermore, the method of controlling the service provision apparatus according to an embodiment of the present invention may be implemented using a computer program (or a computer program product) including a computer-executable instructions. The computer program includes programmable machine instructions processed by a processor, and may be implemented using a high-level programming language, an object-oriented programming language, an assembly language, or a machine language. Furthermore, the computer program may be recorded on a variety of types of computer-readable storage media (e.g., memory, a hard disk, magnetic/optical media, or a solid-state drive (SSD)).

Accordingly, the method of controlling the service provision apparatus according to an embodiment of the present invention may be implemented when a computer program, such as that described above, is executed by a computing device. The computing device may include at least some of a processor, memory, a storage device, a high-speed interface connected to the memory and a high-speed extension port, and a low-speed interface connected to a low-speed bus and the storage device. These components are interconnected using various buses, and may be mounted on a common motherboard or may be mounted using other appropriate methods.

In this case, the processor may process instructions within the computing device. The instructions may be, for example, instructions stored in memory or a storage device in order to display graphic information adapted to provide a graphic user interface (GUI) on an external input/output device, such as a display connected to a high-speed interface. In another embodiment, a plurality of processors and/or a plurality of buses may be properly used along with a plurality of pieces of memory and a plurality of memory forms. Furthermore, the processor may be implemented using a chipset formed by chips that include a plurality of analog and/or digital processors.

Furthermore, the memory stores information within the computing device. For example, the memory may include a volatile memory unit or a set of the volatile memory units. For another example, the memory may include a non-volatile memory unit or a set of the non-volatile memory units. Furthermore, the memory may be another type of computer-readable medium, such as a magnetic or optical disk.

Furthermore, the storage device may provide a large storage space to the computing device. The storage device may be a computer-readable medium, or may be a component including the computer-readable medium. For example, the storage device may also include devices within a storage area network (SAN) or other components, and may be a floppy disk device, a hard disk device, an optical disk device, a tape device, flash memory, or a similar semiconductor memory device or device array.

The above detailed description of the present invention is merely illustrative, and it will be understood that those having ordinary knowledge in the art to which the present invention pertains can easily make modifications and variations without departing from the technical spirit and essential features of the present invention. Therefore, the above-described embodiments are illustrative in all aspects, and are not limitative. For example, each component described as being in a single form may be practiced in a distributed form. In the same manner, components described as being in a distributed form may be practiced in an integrated form.

The scope of the present invention is defined by the attached claims, rather than the detailed description. Furthermore, all modifications and variations derived from the meanings, scope and equivalents of the claims should be construed as falling within the scope of the present invention.

What is claimed is:

1. A service provision apparatus for providing game service, the service provision apparatus comprising: a processor configured to:
   acquire a first user input and a second user input based on input events,
   place a character based on information about a location within a game space included in the first user input, and control movement of a character, selected based on control region information included in the second user input via a control region icon, based on information about a destination location within the game space included in the second user input, wherein the processor determines a location at which the second user input occurs as the destination, and provides the control region icon for selecting a character to be moved based on the destination, wherein the processor displays the control region icon in a form of a deformable animation so as to select the character located within the region of the control region icon, wherein the game space includes a placement region to which the character can be placed, and wherein the processor acquires the first user input including a location at which the input event occurs if the location at which the input event is included in the placement region of the game space, and acquires the second user input including a location at which the input event occurs if the location at which the input event is included in a region other than the placement region of the game space.

2. The service provision apparatus of claim 1, further comprising a touch panel display configured to perform interaction with a user by detecting a touch of the user;

wherein the input event is an event that occurs in response to the touch of the user on the touch panel display.

3. The service provision apparatus of claim 1, wherein the processor provides the control region icon when the input event occurs.

4. A method of controlling a service provision apparatus for providing game service, the method comprising:

acquiring a first user input including information about a location within a game space;

placing a character based on the information about the location included in the first user input;

acquiring a second user input including information about a destination location of a character within the game space, and control region information via a control region icon; and determining the destination based on a location at which the second user input occurs, and controlling movement of a character, selected based on the control region icon provided based on the destination, to the destination, wherein providing the control region icon includes displaying the control region icon in a form of a deformable animation so as to select the character located within the region of the control region icon, wherein the game space includes a placement region to which the character can be placed, and wherein the first user input includes a location at which the input event occurs if the location at which the input event is included in the placement region of the game space, and the second user input includes a location at which the input event occurs if the location at which the input event is included in a region other than the placement region of the game space.

5. The method of claim 4, wherein:

the service provision apparatus further comprises a touch panel display configured to perform interaction with a user by detecting a touch of the user; and each of the first and the second user inputs is acquired based on an event that occurs in response to a touch of the user on the touch panel display.

6. The method of claim 4, wherein displaying the control region icon in the form of a deformable animation includes displaying the control region icon in a form of a deformable animation configured to dynamically vary a size of the control region icon based on a number of times the input event occurs.

7. The method of claim 4, wherein controlling the movement of the selected character to the destination includes performing control to terminate an action of the selected character and move the selected character to the destination if the selected character is performing the action.

8. The method of claim 4, wherein controlling the movement of the selected character to the destination includes performing control to move the selected character to the destination after the selected character has completed an action if the selected character is performing the action.

9. A computer-readable non-transitory storage medium having stored thereon a computer program that, when executed by a processor, causes the processor to execute the method of claim 4.

* * * * *